Jan. 29, 1935.  R. H. PREWITT  1,989,291
AIRPLANE
Filed Aug. 19, 1931  6 Sheets-Sheet 1
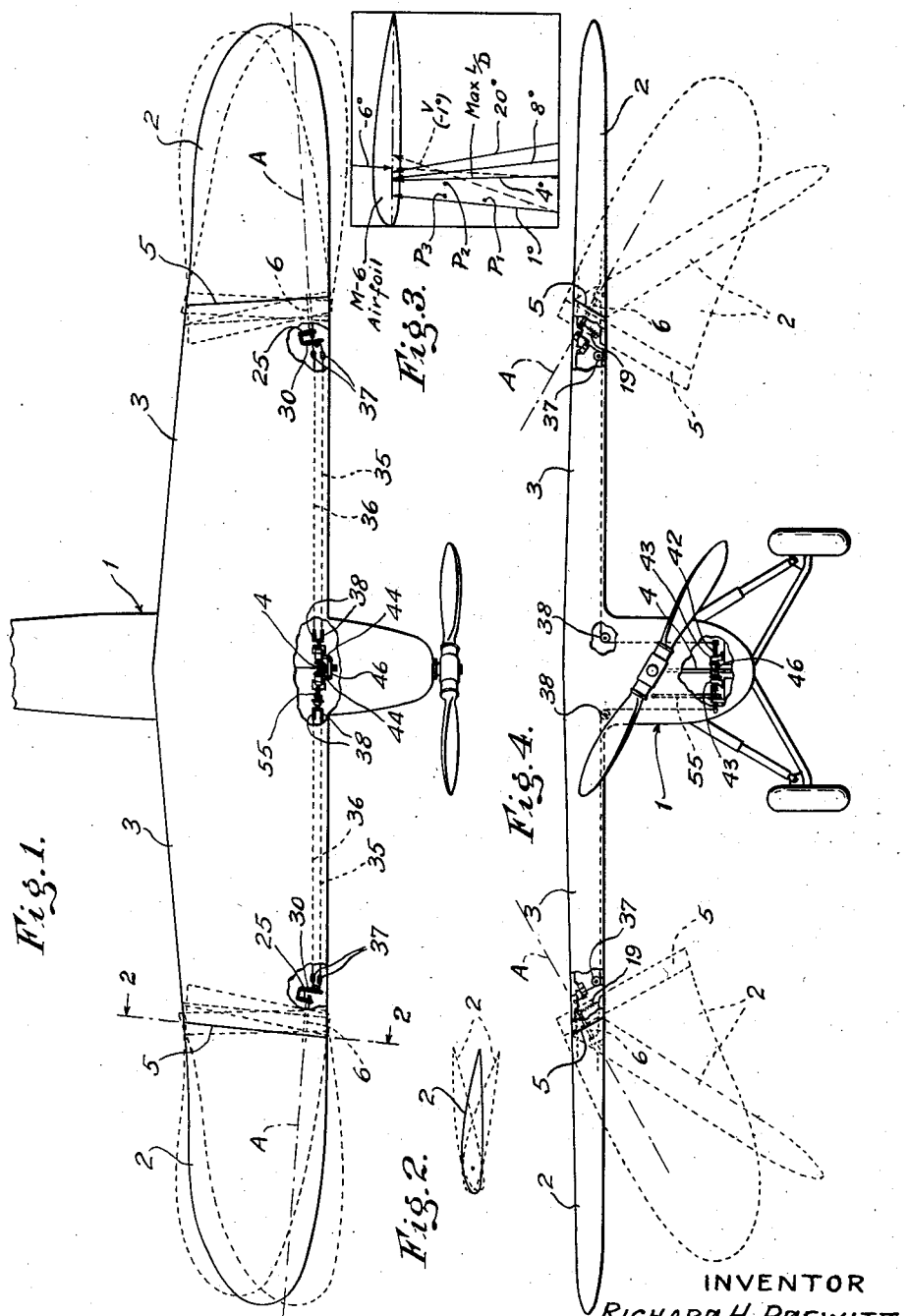
INVENTOR
RICHARD H. PREWITT
BY
ATTORNEY.

Jan. 29, 1935.  R. H. PREWITT  1,989,291
AIRPLANE
Filed Aug. 19, 1931  6 Sheets-Sheet 2
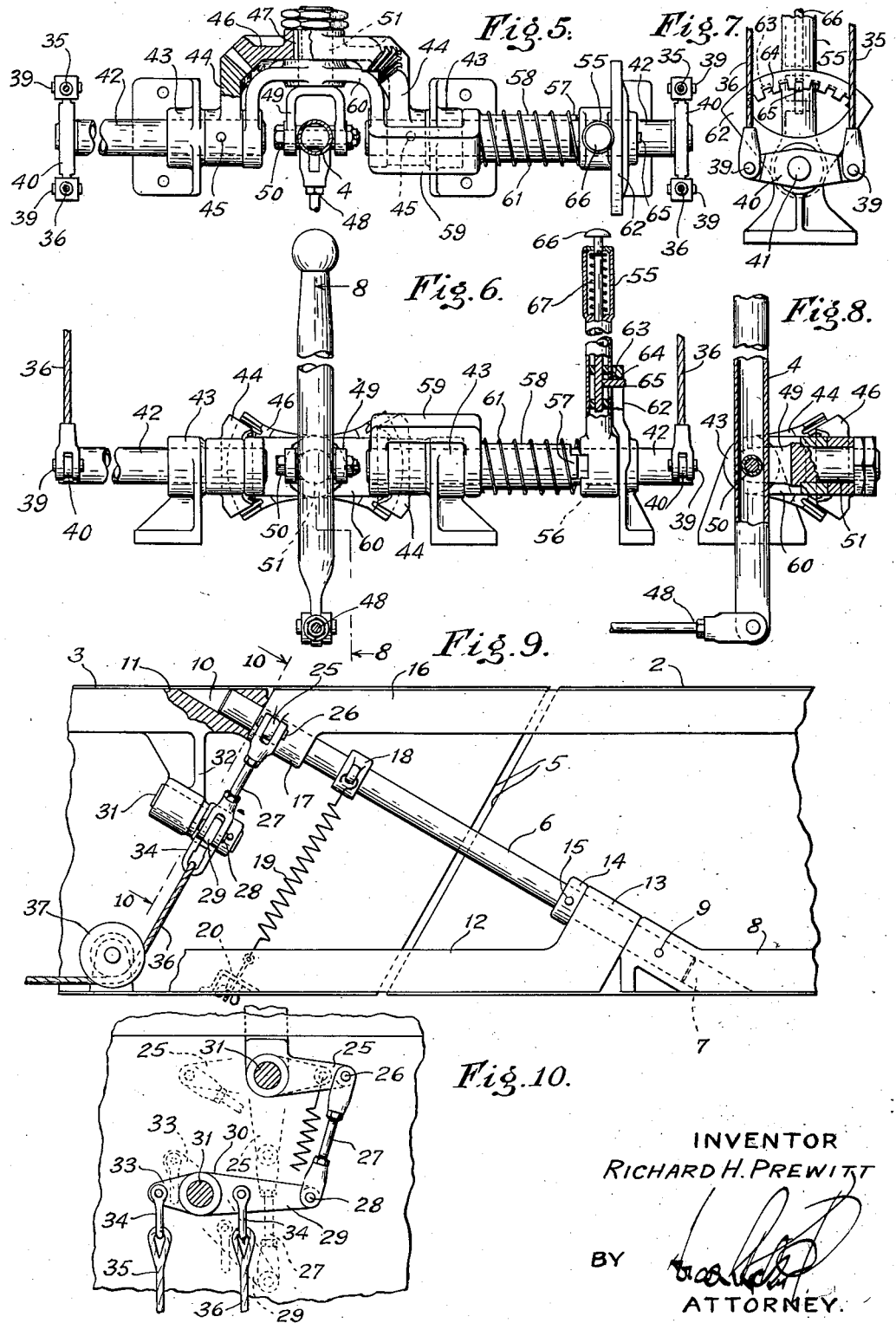
INVENTOR
RICHARD H. PREWITT
BY
ATTORNEY.

Jan. 29, 1935.   R. H. PREWITT   1,989,291
AIRPLANE
Filed Aug. 19, 1931   6 Sheets-Sheet 3
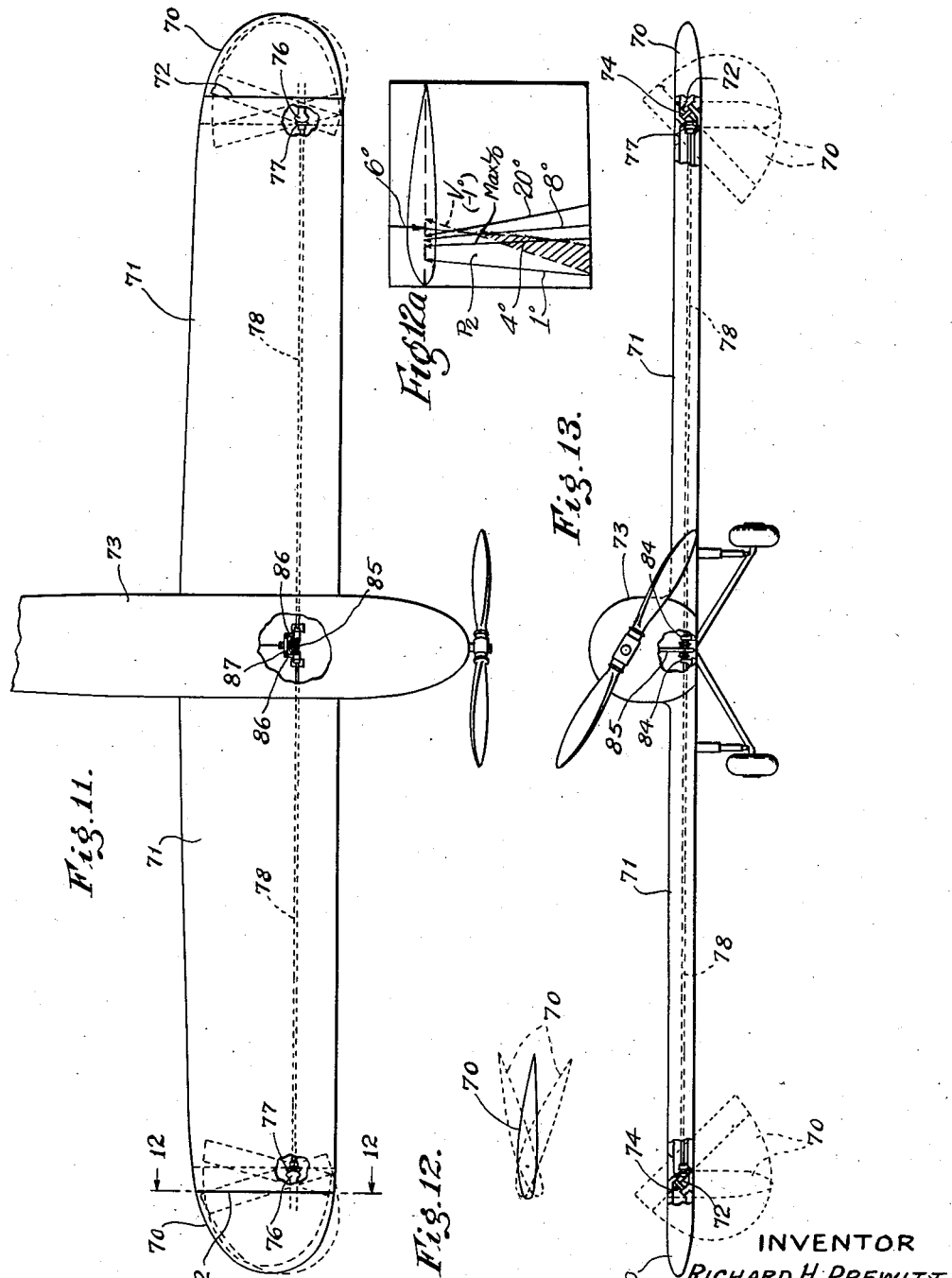

Jan. 29, 1935. R. H. PREWITT 1,989,291
AIRPLANE
Filed Aug. 19, 1931 6 Sheets-Sheet 4
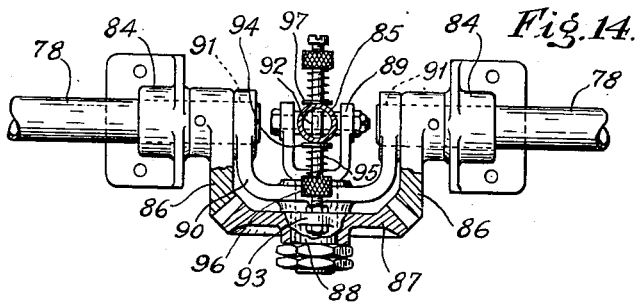
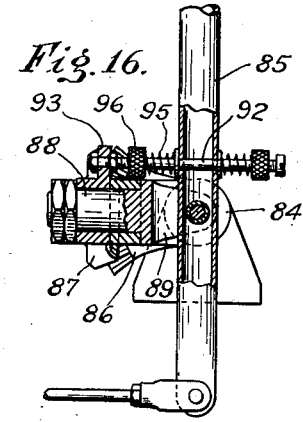
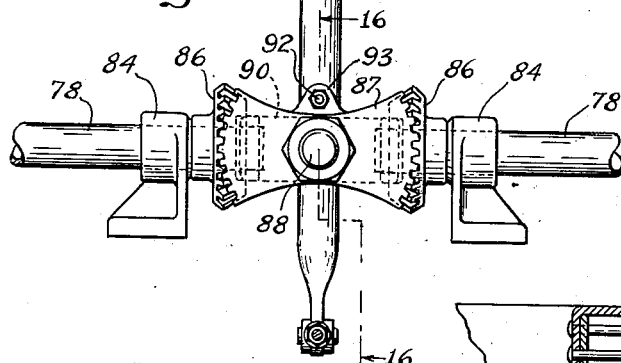
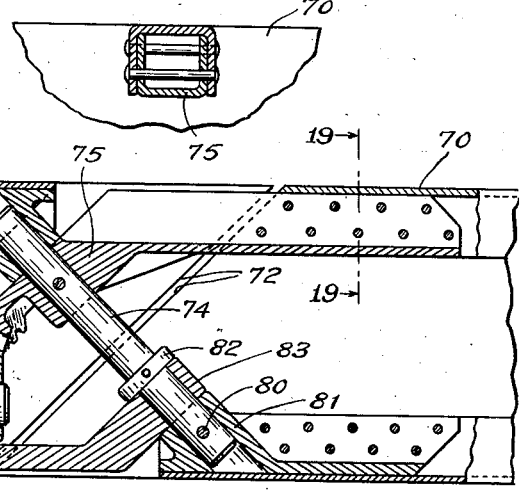
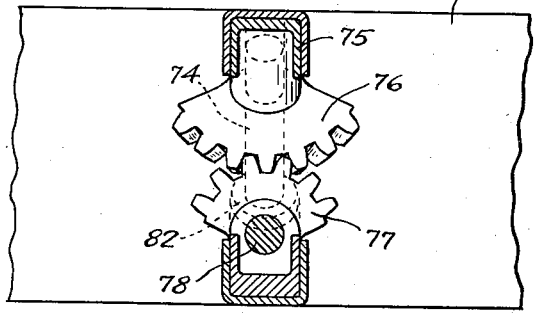
INVENTOR
RICHARD H. PREWITT
BY 
ATTORNEY.

Jan. 29, 1935.  R. H. PREWITT  1,989,291
AIRPLANE
Filed Aug. 19, 1931   6 Sheets-Sheet 5

INVENTOR
RICHARD H. PREWITT
BY
ATTORNEY.

Jan. 29, 1935.  R. H. PREWITT  1,989,291
AIRPLANE
Filed Aug. 19, 1931  6 Sheets-Sheet 6
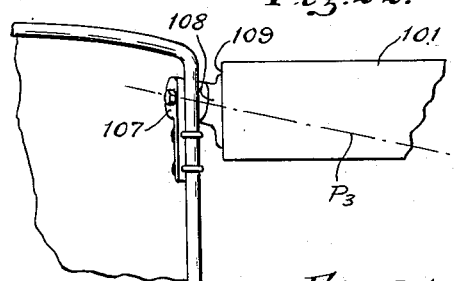
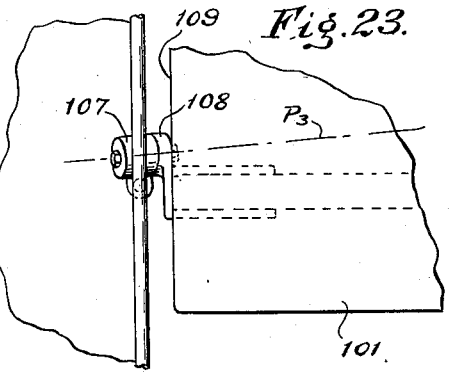
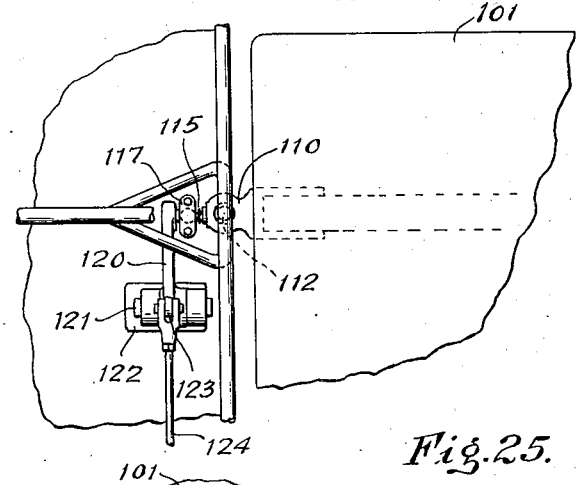
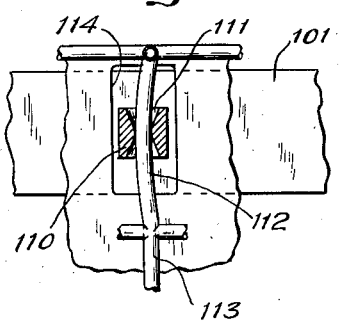
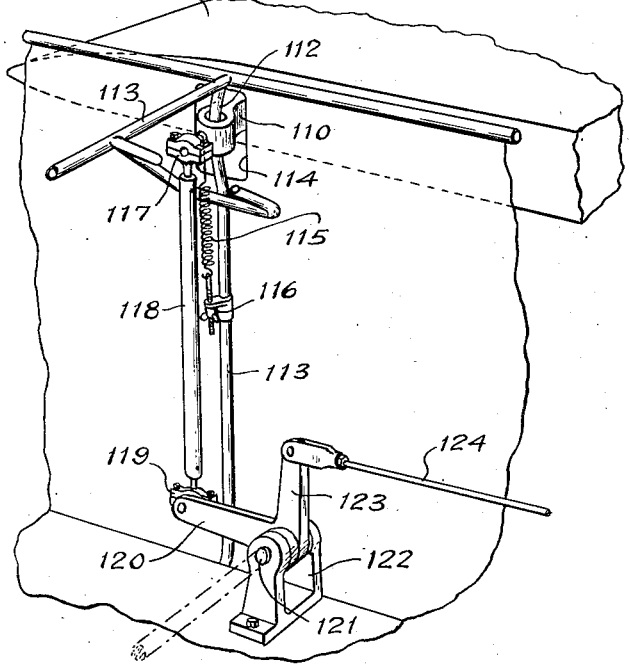
INVENTOR
RICHARD H. PREWITT
BY
ATTORNEY.

Patented Jan. 29, 1935

1,989,291

UNITED STATES PATENT OFFICE 1,989,291

AIRPLANE

Richard H. Prewitt, East Hartford, Conn.

Application August 19, 1931, Serial No. 558,067

71 Claims. (Cl. 244—29)

My invention relates to airplanes.

It has among its objects to provide an improved stable floating airfoil. A further object is to provide an improved airfoil which will float or tend to float, stably in an improved manner about improved pivot means located in an improved position. Another object of my invention is to provide an improved mounting for such an airfoil whereby at varying air speeds the floating position of the airfoil will vary with the speed of flight, while at a constant air speed the same will tend to float at a given angle of attack irrespective of the position of the airfoil relative to the plane. A still further object of my invention is to provide improved floating airfoils such as set forth which are not only particularly effective in minimizing bumps in bumpy air but which further are adapted to be embodied in the form of ailerons or wings, and also to be adjusted in an improved manner, while also being more efficient structurally and free from other objections of floating ailerons or wings heretofore known. Other objects of my invention include the provision with my improved stable floating airfoil structure, of improved supporting, pivoting, and folding means for the same, and improved cooperating controlling means, all whereby improved results may be obtained. These and other objects of my invention will, however, hereinafter more fully appear.

While my invention is generally applicable to airfoils and not limited to use in connection with ailerons or wings, I have shown herein for purposes of illustration three embodiments of the same applied to use in connection with ailerons or wings.

In these drawings,—

Figure 1 is a plan view of a high wing monoplane equipped with ailerons embodying one form of my invention, the plane being shown in flying position with both of the ailerons for purposes of illustration also shown in different dotted positions and certain portions of the wings also broken away to facilitate illustration;

Fig. 2 is a sectional view on line 2—2 of Fig. 1 showing different possible positions of the ailerons during flight and the range of adjustment thereof;

Fig. 3 is the resultant air load vector diagram, showing my improved locations of the pivot points for the constructions shown in Figs. 1 to 10, 11 to 18, and 20 to 26 at $P^1$, $P^2$ and $P^3$, respectively;

Fig. 4 is a front view of the plane illustrated in Fig. 1, with the ailerons shown in full lines in flying position and in two folded positions successively occupied in preparing to enter the hangar, certain portions of the plane here also being broken away to facilitate illustration;

Fig. 5 is a plan view of the control mechanism shown in Fig. 1 as viewed from the top of the sheet, certain portions of the same being shown in section to facilitate illustration;

Fig. 6 is a rear elevational view of this mechanism;

Fig. 7 is an end view of the right hand end of the construction shown in Fig. 6;

Fig. 8 is a sectional view on line 8—8 of Fig. 6;

Fig. 9 is an enlarged view of the aileron connections in the position shown in full lines in Fig. 4;

Fig. 10 is a sectional view on line 10—10 of Fig. 9, a plurality of dotted positions occupied by the parts when the aileron is folded down, also being shown in dotted lines;

Fig. 11 is a plan view, corresponding to Fig. 1, of a low wing plane equipped with a modified form of my invention, the latter herein being provided with a gear type of adjusting and controlling mechanism;

Fig. 12 is a sectional view on line 12—12 of Fig. 11, this view corresponding to Fig. 2;

Figure 12a is a resultant air load vector diagram showing my improved location of the pivot $P^2$ relative to the unstable vector V in the construction shown in Figures 11 to 19, the stable zone between the lines shown in dotted lines in Figure 3 being shaded in this figure to differentiate more clearly from the larger stable zone also illustrated in Figure 3;

Fig. 13 is a front elevation of the plane shown in Fig. 11 with the ailerons in the positions illustrated in Fig. 4;

Fig. 14 is a plan view of the control mechanism used therein, this figure corresponding to Fig. 5;

Fig. 15 is an elevation of this mechanism corresponding to Fig. 6;

Fig. 16 is a sectional view of this mechanism on line 16—16 of Fig. 15 and corresponding to Fig. 8;

Fig. 17 is an enlarged longitudinal sectional view of the aileron connections in the position illustrated in Fig. 13;

Fig. 18 is a detail sectional view on line 18—18 of Fig. 17;

Fig. 19 is a sectional view on line 19—19 of Fig. 17;

Fig. 22 is an enlarged end view of the front connection shown in Fig. 20;

Fig. 23 is a plan view of that connection;

Fig. 24 is a plan view of the rear connection shown in Fig. 20;

Fig. 25 is a perspective view of the rear connection shown in Fig. 20 as viewed from the interior, and Fig. 26 is a detail sectional view of the slide of Fig. 25.

Figure 20:
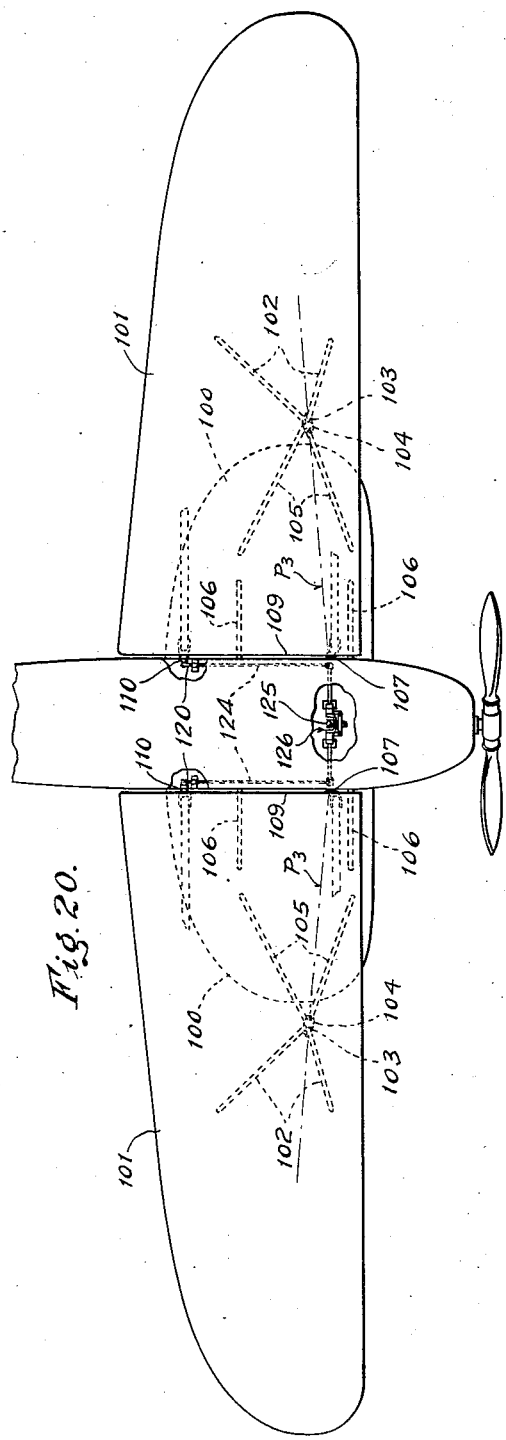
Fig. 20 is a plan view showing a still further modified construction embodying floating wings, as distinguished from ailerons, and applied to a modified form of plane.

Referring first to the form of my invention shown in Figures 1 to 10, it will be understood that I contemplate the use of an airplane 1 of usual fuselage and tail construction and having usual motor, controlling and adjusting mechanism not necessary to be shown herein. It will also be noted that this plane is equipped with improved stable floating ailerons 2, the same being mounted on and forming continuations of the wings 3 of the airplane and provided with improved controlling mechanism including mechanism controllable by the usual control stick 4, all as hereinafter more fully described.

Referring more particularly to my improved construction, it will be noted that the ailerons 2 in this form of my invention constitute a substantial portion of the wing area. Moreover, it will be noted that each of the same is pivoted along a line A (illustrated in Fig. 1) which extends not only laterally and slightly rearwardly as shown in Fig. 1, but also downwardly as shown in Fig. 4. Further, it will be noted that this pivot herein is disposed in such relation relative to the front of the aileron as shown in Fig. 1 as to locate approximately 15 per cent of the area of the aileron in front of the pivot and the main area of the aileron in back of the pivot. Attention is further directed to the fact that herein the ailerons 2 form in cross section a continuation or extension of the wings 3. While the adjacent end surfaces 5 between the ailerons 2 and the wings 3 may be disposed in different positions from that shown, herein the same, when viewed from the top, extend rearwardly and toward the fuselage as shown in plan in Figure 1. Also, it will be noted that they extend downwardly and at an angle toward the fuselage, as shown in the sectional view, Figure 4. As illustrated, the faces 5 are also spaced slightly apart in such manner as to permit free movement of the ailerons 2 about pivots on the wings perpendicular to the faces 5 and hereinafter more fully described.

Upon the adjacent extremities of each wing 3 and aileron 2, improved pivot or hinge connections are also provided. Inasmuch as these connections are identical for each aileron, save for the reversed disposition of the parts, it will be sufficient to describe only one of these connections. More particularly referring to Figure 9, it will be noted that a pivot member 6 is provided, disposed as hereinabove described and herein in the form of a suitable rod. This rod 6 is herein mounted at one end in an angularly disposed socket 7 carried on a longitudinal bottom frame member 8 on the aileron 2, and suitably fixed therein as by a pin 9. The other end of the rod is herein disposed in a corresponding socket 10 on a longitudinal frame member 11 on top of the wing 3. Both of these sockets are on opposite sides of the meeting faces 5 heretofore referred to and preferably spaced therefrom substantially as shown. Moreover, it will be noted that a longitudinal lower frame member 12 on the wing projects transversely of these faces into the aileron and has an angularly disposed end portion 13 adjacent the socket 7, through which the rod 6 is passed, while a collar 14 on the rod, held by a suitable pin 15, serves to position the rod relative to the portion 13. Similarly, a longitudinal frame member 16 on the upper part of the aileron has an angularly disposed portion 17 disposed parallel to the portion 13 and on the opposite side of the meeting faces 5. Attention is also directed to the fact that means are provided for so weighting the ailerons as to tend constantly to rotate them into higher angles of attack. While various weighting means may be provided to perform this function and the weight distribution of the aileron forms a part of all of the same, herein supplementary weighting or torque exerting means are provided in the form of a spring connection including a lugged collar 18 suitably fixed on the rod 6, herein more nearly adjacent the portion 17 and parallel thereto, and a suitable spring 19, herein a coiled spring, connected at one end to its lug and at the other end to a suitable abutment means 20, preferably adjustable to obtain lateral stability and carried by the member 12. Thus, the rod 6 and the aileron 2 are constantly subjected to an external torque tending to rotate the rod and aileron in socket 10 and bearing 13 in the direction tending to rotate the aileron into a higher angle of attack determined by the particular adjustment of the spring.

In connection with the positions of the ailerons 2 during flight, Figures 1, 2 and 3 should be noted. The floating position will be substantially in line with the wings or at some smaller angle of attack. Each aileron also is free to be adjusted during flight into the dotted line positions shown in plan in Fig. 1, and in section in Fig. 2, or any position between these extreme positions. It will also be clear from a consideration of Fig. 3, which shows a vector diagram at the center of pressure of the airfoil, that with the pivot disposed as taught herein, the latter will be in the position indicated at $P^1$ relative to the air load vectors, i. e., located substantially in the stable air load distribution area, herein bounded by the vectors representing angles of attack of plus 1° and minus 6° and plus 20°, and comprising the vectors which are consecutively arranged with increasing angle of attack from the leading edge to the trailing edge of the airfoil, and in that portion of said stable air load distribution area which contains the vectors of small co-efficients. Accordingly, the axis of pivotation of each aileron in thus extending angularly as described, will pierce the plane of the resultant air load vectors in a stable region.

Here it will be understood that by a resultant air load vector, I refer to the resultant of all air loads on the airfoil at a given angle of attack and which therefore lies at approximately the center of the airfoil linearly, or, more particularly, at the center of pressure of the airfoil. It further will be understood that when several vectors, disposed fore and aft, are taken together, they lie approximately in a plane which contains the loci of the centers of pressure of the airfoil and is perpendicular to the airfoil and therefore definitely located, as illustrated in Figure 3. Thus, since the total load on the airfoil may be assumed to act at the center of pressure of the airfoil, and the resultant air load vector indicates the position and direction in which the total airload acts, this plane of the resultant air load vectors provides a proper standard or criterion for locating the axis of pivotation for any floating airfoil. Herein, it will be noted that I have utilized this fact and have so disposed the axis of pivotation below the airfoil and piercing this plane of the resultant air load vectors in a stable region as to be able to obtain a wholly new and stable floating airfoil having markedly advantageous characteristics as will hereinafter more fully appear.

It will be evident that, with the floating airfoil, in effect, weighted as described, in such manner as to produce an external torque on the airfoil constantly tending to rotate it into higher angles of attack, the angle of attack of the airfoil will depend upon the air speed. More particularly, the weighting or torque exerting forces including the weight of the aileron and the spring, will remain nearly constant, but the forces due to the air loads will vary directly with the speed of flight squared and will vary as the angle of attack of the floating surfaces is varied, all in such manner that the floating position of the airfoil or ailerons will depend on the speed of flight. It will also be evident that at constant speed the ailerons will tend to float at a given angle of attack irrespective of their position relative to the plane, in such manner as effectively to minimize "bumps" in air having vertical currents.

Co-operating with these pivotally mounted automatically floating ailerons is also improved means for connecting the same for adjustment by the stick 4. While these means may obviously assume different forms, it will be noted that I have herein shown the same in the form of cable connections. More particularly, it will be noted that the portion 17 on each aileron is provided with a lever or arm 25, corresponding to the lug on the collar 18 but slightly longer than the lug on the latter. This arm 25 is in turn pivotally connected at 26 to a suitable depending link 27, preferably adjustable, which is in turn pivotally connected at 28 to the longer arm 29 of a lever 30 rotatable about a bearing 31. As shown, this bearing is carried on a depending extension 32 on the upper part of the wing 3 and is also disposed beneath and parallel to the member 6. Moreover, it will be noted that the member 30 is provided with a short arm 33 extending oppositely from the arm 29 and that both of these arms are connected through suitable links or clevises 34 with cables 35 and 36, the connections being equally spaced from the axis of the bearing and on opposite sides of the latter. These cables, in turn, are extended around spaced rollers 37 mounted on the under part of the wing 3 and also extend along the bottom of the wing toward the fuselage and within the latter, as shown in Fig. 1.

As regards the mechanism within the fuselage, it will be noted that at suitable points within the fuselage, these cables 35 and 36 also extend around corresponding spaced rollers 38 and downward therefrom inside the fuselage, as shown in Fig. 4. At their lower ends, they are also pivotally connected at 39 to opposite ends of levers 40 of equal length. These levers 40, as shown, are disposed longitudinally of the fuselage and are fixed to opposite ends 41 of members 42 journaled in suitable bearings 43 on opposite sides of the stick 4. Further, it will be noted that gear members 44 of sector form, are suitably fixed, as by pins 45, to the inner ends of the members 42, and that these gear sectors 44 each have bevelled teeth meshing with an intermediate double sector 46 having oppositely extending bevelled toothed portions and suitably connected, as by a key 47, to rotate with the stick 4 when the latter is moved to operate its associated control mechanism 48. More particularly considering this mechanism, it will be noted that the connection with the stick 4 includes a U-bracket 49 having its arms extending to opposite sides of the stick 4 and carrying a pivotal connection 50 for the stick 4 above the mechanism 48, while the bracket also carries a shaft 51 extending axially through the gear 46 and keyed thereto at 47, while also being suitably positioned by lock nuts on the free end of the shaft. It will thus be evident that the stick 4 is free to be moved fore and aft to operate the other controlling mechanism of the plane, as, for example, the elevators (not shown). When, however, the stick is so moved laterally as to rotate the member 46, the gear segments 44 will be reversely operated to operate the ailerons reversely through their connected mechanism, including the pairs of cables 35, 36, all in such manner as to enable the ailerons to be adjusted readily without interference with the other controls.

Here attention is also directed to the fact that my improved construction makes it possible for ailerons to be folded in such manner as to produce a very compact construction adapted to occupy a small space in the hangar. Here it will be noted that while the ailerons during flight will normally float, the same will automatically tend to drop due to their weight as soon as the plane comes to rest. More particularly referring to Fig. 10, it will be noted that while the parts therein will assume approximately the position shown in full lines during flight, as soon as the plane comes to rest, the weight of the ailerons will automatically cause the parts in Fig. 10 to move from the position shown in full lines through the vertical dotted or dead center position shown, and into the left hand dotted line position illustrated, while the aileron will swing from its flight positon shown in Fig. 4, through a braking or intermediate position shown in dotted lines therein, and into the lower or folded position shown in dotted lines in that figure, wherein the tip of the aileron is disposed close to the ground. Thus it will be observed that with the two ailerons thus folded, the width of the plane is very substantially reduced not only when measured across the tips of the folded ailerons, but even more when measured across the wings. Here attention is also directed to the fact that due to my improved pivot construction by which the ailerons are attached to the plane through two sets of hinges forming a truss, the construction is not only exceedingly strong during flight, but also such as to be well adapted to withstand such folding movements of the ailerons when the plane is upon the ground.

I have also provided improved supplementary means for controlling the ailerons, including a supplementary stick or lever 55. Herein, it will be noted that this stick is disposed at one side of the main stick 4, preferably parallel to and adjacent the latter at the right hand side of the same as shown in Fig. 1. More particularly, it will be observed that this stick 55 moves about a pivot 56 on one of the members 42 and that it is adapted to be moved longitudinally on the latter member to connect or disconnect a toothed clutch 57 on a sleeve 58 enclosing one member 42. At a point adjacent the adjacent bearing 43, the sleeve 58 is also provided with a U-portion 59 which passes over the bearing and the adjacent hub of the adjacent gear segment 44. As shown, this U-portion 59 is also connected to another U-portion 60, which is journaled on the shaft 51 between the gear 46 and the U-member 49, while both ends of the member 60 are rotatable relative to the members 42. Thus it will be evident that when the member 60 is rotated about the axes of the members 42 by the stick 55, the toothed members 44 and 46 will be locked and both members 42 moved together as the members 44, 46 move bodily about the pivots in the bearings 43.

Co-operating with the supplementary stick 55, I have also shown a spring 61 coiled about the sleeve 58 and acting between the U-portion 59 and the hub of the stick 55 and tending normally to force the stick to the right in the position shown in Fig. 6. Further, it will be noted that I have provided other co-operating positioning means for the supplementary stick 55 in the form of a stationary toothed sector 62 having two series of notches 63 and 64 of different length spaced along the same. Co-operating with this sector is a reciprocable laterally extending member 65 carried by the stick 55 and receivable in either set of notches, this member 65 being operable by means of a plunger 66 in the end of the stick and normally projected out through the stick by a coiled spring 67 in the upper end of the latter. Thus it will be observed that it is not only possible for the supplementary stick 55 to be held in different positions when the clutch 57 is disengaged, but also to be held in different positions while the clutch is engaged.

As a result of this supplementary mechanism, it will be noted that it is made possible, by changing the position of the supplementary stick 55 during flight, to change the floating position of the ailerons so that they may be made to float at any desired angle of attack and at the most efficient angle of attack for any speed of flight. Further, it will be observed that it is made possible, through changing the angle of attack of the floating ailerons with the lever 55, to increase or decrease the total lift of the plane and in this manner increase or decrease the rate of descent or ascent. Attention is further directed to the fact that by sliding the lever to the left in Fig. 6 in such manner as to connect the clutch 57, the lever is so connected as to be operable to move the ailerons from their folded position into their flying position. To effect this when the clutch 57 is in mesh, the lever 55 is first pulled back hard in such manner as to throw the parts shown in Fig. 10 from the left hand dotted line position through the vertical dotted line position shown therein, i. e. past the dead center. Then, the lever is pushed hard forward in such manner as through the pull of the other cable to finish the operation of locating the ailerons in flying position. Further, it will be noted that the member 65 on the lever 55 will then engage in the shallow notches 63 in such manner as to hold the lever in position, and consequently the ailerons. Here, of course, it will also be understood that once the plane is in flight, the lever 55 is released from these notches and allowed to slide to the right into its normal position with the member 65 in engagement with the notches 64 and the clutch 57 disconnected.

In the form of my invention shown in Figures 11 to 19, it will be noted that I have shown the same applied to a low winged monoplane. In this form, it will also be observed that the movable control surfaces, herein in the form of ailerons 70, are smaller as compared with the wings 71, than those shown in Fig. 1 and just large enough to give the plane the desired maximum rolling moments when one of the ailerons is at its angle of attack of maximum lift and the other is at some negative angle of attack of inverted flight. Further, it will be noted that the adjacent end surfaces 72 between the ailerons and wings, while being inclined downwardly and toward the fuselage 73, are disposed at a slightly greater angle than heretofore described, and also extend substantially parallel to the fuselage. It will also be observed that the pivot member 74, while extending angularly downward as heretofore described, extends downward at a slightly greater angle and is also disposed transversely and slightly further back from the front edges of the wing and aileron, than is the case in the construction shown in Fig. 1.

Attention is also directed to the fact that these pivots are so located, as indicated at $P^2$ in Fig. 3, on or near the air load vector of maximum L/D, or maximum efficiency, and essentially in the stable vector distribution area, that the air loads tend to keep the ailerons floating at this angle of attack irrespective of the angle of attack of the plane. It will also be noted that while each aileron is movable about its pivot, as heretofore described, there is no spring connection on the aileron constantly acting upon the latter and tending to make it assume a higher angle of attack, the same herein, since it is pivoted to float at the angle of attack of maximum L/D in such manner that the air loads tend to maintain the same in position, instead being controlled only by gravity, the air loads acting upon it in flight, and certain control mechanism hereinafter described.

Referring more particularly to the aileron mountings, it will be noted that each aileron 70 is provided with a projecting portion 75 carried in the top thereof and rigidly mounted on the aileron as shown in Figs. 17 and 19. Each of these portions 75 also has a toothed sector 76 thereon engageable with a corresponding sector 77 carried by a transverse operating shaft 78 journaled on the bottom of the wing structure within the wing. Moreover, it will be noted that the pivot rod 74 is journaled in a bearing 79, similar to the bearing 10, at its upper end, and suitably fixed at its lower end as at 80 in a socket 81, corresponding to the socket 7 and also rigidly attached to the aileron as in Fig. 19. As shown, this rod 74 also carries a collar 82 fixed thereto and corresponding to the collar 14. Also, a journal portion 83 for the pivot 74 is provided on the lower part of the wing and disposed parallel to the portion 75 between the collar 82 and socket 81, this portion 83 corresponding to the portion 13 heretofore described.

Referring more particularly to the control mechanism carried by the fuselage, it will be noted that each shaft 78 is mounted in a suitable journal 84 in the fuselage adjacent the usual control stick 85. Further, it will be noted that a bevelled toothed sector 86 is suitably fixed to each shaft between the bearing 84 and the stick, and that these sectors each mesh with a co-operating pivoted double sector 87 having oppositely extending bevelled toothed portions. This member 87 is in turn keyed on the shaft 88 of a U-member 89, corresponding to the member 49, and likewise similarly pivotally connected to the stick 85.

Herein also, it will be noted that a U-member 90 corresponding to the member 60 is provided, having a pivotal connection 91 on the ends of the shafts 78 and also journaled on the shaft 88. Thus it will be evident that, although due to the use of gears rather than cables, the location of the meshing elements has been reversed relative to the stick, the ailerons will be controllable by the stick in the same general manner heretofore described.

Herein, it will, however, be noted that the stick 85 is connected to the ailerons in its fore and aft movement by a new control mechanism which, while not necessary, may be used if desired. More particularly, it will be observed that a rod 92 carried on a member 93 formed on the hub of the double sector 87, has a washer 94 normally projected into engagement with the stick 85 by a coiled spring 95 adjustable by a suitable nut 96. It will accordingly be noted that a resilient abutment is provided against which the stick acts when moving in one fore and aft direction. Also, it will be observed that a similar spring pressed washer 97 is provided on the opposite end of the rod 92 which acts similarly when the stick is moved in the opposite direction. Thus, as the stick 85 is pulled back to place the plane in high angles of attack, the shafts 78 connected to the movable ailerons have a tendency to rotate back with the stick through the action of the spring abutments described. Further, it will be noted that since the gears between the ailerons and the shafts reverse the direction of rotation, the ailerons will be rotated forward when the stick is pulled back, or back when the stick is pushed forward. Thus, when the plane is placed in high angles of attack, the ailerons rotate forward into lower angles of attack due to the action of the stick, and the mechanism acts as a safety means preventing the ailerons from excessive movement from their normal floating positions, i. e. at the angle of attack of maximum L/D, as might possibly be the case in inverted flight or in a tail spin. As previously indicated, it will also be evident that this connection may be omitted if desired, the control stick then, of course, acting positively on the ailerons and a like effect also being obtainable by screwing up the nuts 96 against the stick.

It will also be noted that in this construction it is possible for the ailerons 70 to be lowered or folded, as heretofore described in connection with Figs. 1 to 10. To accomplish this, the stick 85 is pushed full forward and full to one side, for example to the right, whereupon the left aileron will be rotated back until the gear segments on the left wing are just disengaged, whereupon the aileron is allowed to fall the remaining distance to the vertical folded position indicated in dotted lines in Fig. 13. Obviously, the other aileron may be similarly folded by pushing the stick to the left. Further, it will be evident that the ailerons may be returned to flying position when the operations are reversed and the ailerons are manually lifted successively, so that their gear sectors will come in mesh. Obviously, this construction may also be provided with mechanism for enabling the ailerons to be returned to flying position from the cock pit without the aid of anyone except the pilot, this mechanism being generally similar to that heretofore described save in this instance the single additional lever attached to the aileron, as heretofore described, will have a single cable running from the lever to the cock pit, tension on which, when the floating airfoil is in folded position, will cause the aileron to be rotated sufficiently toward flying position so that its gears will just come in mesh.

While I have described this form of my invention, wherein the resilient torque means is omitted, as floating at the angle of attack of maximum L/D, and with the pivots located on or near the air load vector of maximum L/D, it will be evident that this type of airfoil is not restricted to floating at this particular angle of attack and may, if desired, float at other constant angles of attack while continuing to have the pivot line pierce the plane of the resultant air load vectors in a stable region. In other words, as distinguished from the varying angle of attack resulting from the use of the resilient means described in connection with the form of my invention shown in Figures 1 to 10, I may, where I eliminate these means, not only cause the airfoil to float at the particular angle of attack used for illustrative purposes in Figures 11 to 19, but, if desired, cause the same to float at any other selected or constant angle of attack while still having the pivot disposed properly relative to the air foil and piercing the plane of the resultant air load vectors in a stable region of appreciable thrust producing vectors.

In this form of my invention wherein no biasing or resilient means are provided to make the ailerons float stably and the ailerons are operable by gearing from the stick, I also contemplate the pivotation of the air foils as taught for the purpose of reducing the effort required to vary the incidence angles. Thus, for example, when varying the angle of attack by adjusting the air foil means about my improved axis of pivotation $P^2$, it will be evident that, as more clearly shown in Figure 12a. I have taught the location of this pivot below the air foil means and the chord line thereof while piercing the plane of the resultant air load vectors in a neutral zone adjacent the unstable vector V and the point of convergence of vectors of neutral stability and above and in front of the strictly stable air load distribution area. This makes it possible to vary the incidence angles where such an unstable vector V exists with a minimum of effort and in such manner as markedly to facilitate varying the lift and also the speed as desired; for example, during ascent or descent. Moreover, during descent, an effective air braking means is obtained by varying the angle of attack of the air foil means to increase the lift, and this braking means is also made readily operable by reason of my improved location of the axis of pivotation in a neutral zone as above described.

Figure 21:
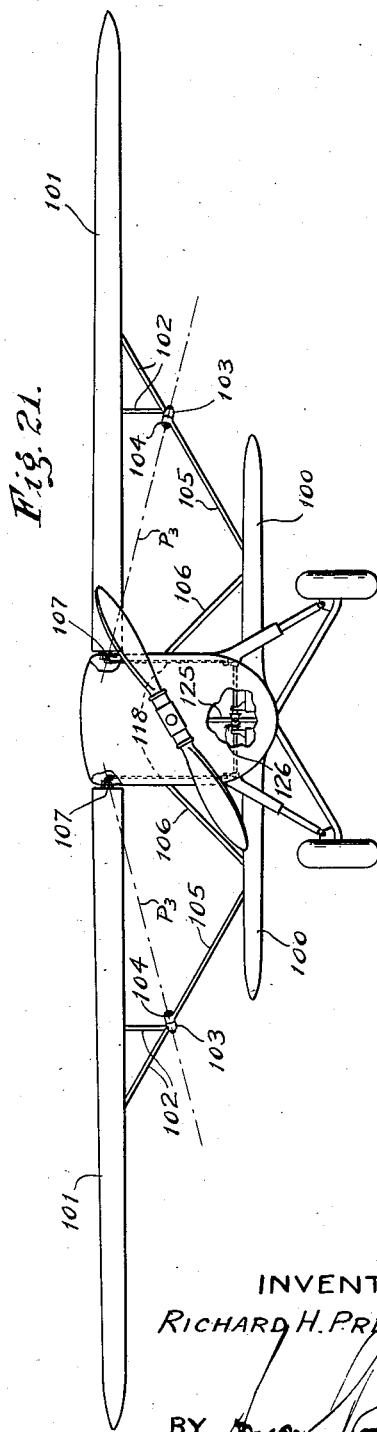
Fig. 21 is a front view of the construction shown in Fig. 20.

In the form of my invention shown in Figures 20 to 26 I have shown the same applied to use in connection with wings, as distinguished from ailerons, with the wing pivots mounted in my improved location and the wings functioning as floating airfoils. Herein, it will be noted that the same is shown applied to a plane having short stationary lower wings 100 and longer movable upper wings 101 pivoted and adjustable in the same general manner hereinbefore described in connection with Figs. 1 to 10. As shown, each wing 101 is provided with depending braces 102 extending downward and toward the fuselage and one another from longitudinally spaced points substantially midway between the ends of the wings. These braces 102 in turn carry a pivot member 103 and are movable about co-operating stationary pivot means 104 carried by a plurality of upwardly and outwardly disposed connected braces 105 which in turn are supported at their lower ends in longitudinally spaced rotation intermediate the ends of the adjacent stub wing 100, while the latter herein is also braced on the fuselage by a plurality of upwardly extending braces 106 connected to the latter. Herein, it will also be observed that a co-operating pivot for the wing, comprising a member 107 carried by the fuselage and a member 108 carried by the adjacent end surface 109 of the movable wing, is provided near the front edge of the latter and on the fuselage at a point higher than the pivot connection 103, 104, but with its axis disposed coaxially with the axis thereof. Thus the pivot line, indicated at $P^3$, extends from the fuselage slightly rearwardly at an angle, as shown in Fig. 20, and also downwardly, as shown in Fig. 21, in such manner as to be located substantially in the stable distribution area as heretofore described.

Co-operating with this mechanism is also spring mechanism constantly tending to rotate the wings into higher angles of attack, and also controlling mechanism for the wings. Both of these, broadly speaking, are of the general character described in connection with the form of my invention shown in Figures 1 to 10, but structurally different therefrom as will hereafter appear. More particularly, it will be noted that each of the wings 101 carries near its rear edge and adjacent the fuselage a projection 110 having an aperture 111 therein. The latter is preferably roll-mounted at each end, as shown, to reduce friction, but if desired may be provided with roller bearings therein, so that it is adapted to move freely along a depending arcuate portion 112 on a fuselage frame member 113 as the wing moves about its pivot line $P^3$, and thus permit a limited movement of the wing relative to the fuselage about the pivots 103, 104 and 108, 109, heretofore described. Herein, this projection 110 extends through a suitable slot 114 in the side of the fuselage in such manner as to reduce the drag. Attention is also directed to the fact that the supplemental weighting means is provided herein in the form of a depending coiled spring 115 connected at its upper end to the member 110 and at its lower end having an adjustable connection 116 to the lower end of the frame member 113 at a point below the arcuate portion 112. Thus it will be evident that the wing will float within the limits of the arcuate portion 112 while being constantly subjected to the torque of the spring 115 which tends to move the wing into a higher angle of attack, all in the general manner previously described in connection with Figures 1 to 10. Moreover, it will be noted that a ball joint 117 is connected to the inner side of the member 110 and that a rod 118 depends from the ball joint and is connected by another ball joint 119 to a lever 120 pivotally mounted at 121 in a suitable frame 122 on the fuselage and having an upstanding bell crank arm 123 suitably connected through a rod 124 to differential controlling mechanism adjacent the stick 125.

Inasmuch as this controlling mechanism associated with the stick and connecting and controlling the two wings, is essentially the same as that heretofore described in connection with both Figures 1 to 10 and Figures 11 to 19, being the same as that shown in Figures 14 and 15 without the spring abutment devices thereof, it seems unnecessary to repeat that description or specifically describe the same, other than to say that the same is located in front of the mechanism shown in Fig. 25 with the connections 124 running longitudinally on opposite sides of the fuselage and connected thereto by suitable levers or the like. Obviously, through this mechanism, herein generally indicated at 126, the wings may be manually operated by means of the stick, the latter being moved toward the right side of the cock pit to move the left wing into higher angles of attack and the right wing into lower angles of attack, and vice versa. It will, of course, be understood that the operating mechanism should be sufficiently strong and have sufficient power to overcome both the forces of the springs and air loads at the maximum design speed of the plane in order that the lateral control will be effective at all air speeds. It will also be evident that if it is desired, provision for dual control mechanism may be made by extending the axis 121 as shown in dotted lines in Fig. 25.

In this construction, substantially all of the sustaining means, i. e. the complete upper wings, will float in a limited range at cruising speed of the plane. More particularly, the air loads tend to rotate the wings forward into lower angles of attack, while the weighting means, including the springs 115, tend to rotate the wings back into higher angles of attack. Thus, since the moments due to the weighting means are nearly constant and the moments due to the air loads vary with the speed squared, it will be seen that the wings will float at a particular angle of attack for the air speed corresponding to that angle of attack. For example, if the plane cruises at 100 miles an hour, and the wings, in order to maintain level flight, meet the air at zero degree angle of attack, the wings will, with their limited movement relative to the plane to each side of their normal floating position, automatically alter their position when the plane goes into upward or downward currents of air. Thus it will be seen that this type of plane will have the effect of eliminating the undesirable bumps often encountered when flying low or when flying near clouds. Here, of course, it will also be understood that although the plane as shown is equipped with lower stub wings, my improved floating wings may also be applied to monoplanes by mounting the supports 105 on the fuselage and that when so applied, since the whole sustaining means of the aircraft will then float, the effect of eliminating bumps will be even greater than when applied to the illustrative stub wing type of plane. Further, of course, it will be evident that my improved arrangement and disposition of the sustaining means, wherein the latter is movable about a lateral axis of pivotation disposed forward of the resultant thrust vectors and is biased against resilient means in such manner as effectively to minimize bumps in bumpy air, is not limited to use in connection with either biplanes or monoplanes, and is adapted generally to use in aircraft wherever it is desired to provide a shock reducing means between the sustaining means thereof and the fuselage of the craft.

As a result of my improvements in mounting airfoils, and particularly of my improved location of the line of pivotation of the airfoil in a stable region beneath the latter, and in a new relation to the plane of the resultant air load vectors of the airfoil, it will be evident that it is made possible to obtain markedly improved results, as compared with the prior method of locating the axis of rotation of the airfoil relative to the center of pressure of the same. Further, it will be noted that by determining the resultant air load vectors, and locating the pivots relative thereto, as herein described, a very effective method of attaining floating airfoils is provided, and one which is especially effective when the axis of rotation is remote from the airfoil, i. e. in the stable air load distribution area which lies below the airfoil and which, for a stable airfoil, begins near the latter, and, for an unstable airfoil, is removed several chord lengths below the airfoil. More particularly, as a result of locating the axis of rotation in my improved location through the use of my improved method, I have been able to obtain airfoils which, as distinguished from having mere weathervane stability, are capable of floating at any predetermined angle of attack and without requiring assistance from external connections for floating purposes. Further, it will be evident that through the use of my improved resilient connections for the airfoil, the latter may be caused to float at a varying angle of attack, while, when these means are omitted, the airfoils may float at a constant angle of attack. It will, of course, also be evident that by varying the relation of the axis of pivotation to the resultant air load vectors, it is possible to cause the airfoil to float at any desired angle of attack.

While in the forms of my invention shown herein I have shown the airfoil pivot substantially in or in the stable vector distribution area, it will, of course, also be understood that I contemplate the possibility that my construction may be used in such manner as to produce a stable floating airfoil even although the airfoil be pivoted forward of and/or above an unstable vector or vectors, as, for example, the vector V of minus one degree illustrated in Fig. 3, and that where such an arrangement is used, I contemplate the use of weighting means including springs which have rotating moments such as to overcome the resulting small rotating moments of the unstable vector or vectors, and accordingly produce a stable floating airfoil. Although, as stated above, the air foil may float stably and the axis of pivotation lie in substantially a stable region relative to the vectors of a stable air foil shown in full lines in Figure 3, this is not the fact when the dotted vectors in Figure 3 are considered. When the vector V represents an unstable vector, i. e. when the strictly stable air load distribution area lies below and to the rear of this vector as shown in Figure 3 and more clearly evident from Figure 12a, a pivot such as the pivot P² described above in connection with the form of my invention illustrated in Figures 11 to 19, would lie in the neutral zone of an unstable air foil. In other words, although remaining in the same position, this pivot P² lies in different zones for stable and unstable air foils, pivot P², for unstable air foils, i. e. when an unstable vector such as the dotted vector V exists, and no biasing means are employed to make the air foil float stably, being located in this neutral zone in such manner as to be controllably pivoted for requiring the least effort for operation; while for stable air foils such as shown by the solid line vectors and when biasing means are provided to make the air foil float stably, this same pivot P² is in a substantially stable region.

While I have herein specifically described three forms which my invention may assume in practice, it will be understood that these forms are used for illustrative purposes and that my invention is not limited thereto, but may be embodied in other forms and utilized with airfoils other than ailerons or wings and also modified in various structural and other respects without departing from its spirit or the scope of the appended claims.

What I claim as new and desire to secure by Letters Patent is:—

1. An aircraft having floating airfoil means pivoted about a line of rotation lying substantially in the stable air load distribution area of said means and piercing the plane of the resultant air load vectors externally of said means.

2. An aircraft having stable floating airfoil means pivoted about a line of rotation disposed angularly relative to said means.

3. An aircraft having a floating airfoil pivoted about an inclined axis of pivotation extending into the stable air load distribution area below said airfoil.

4. An aircraft having an airfoil pivoted about an axis of pivotation extended into the stable air load distribution area thereof and piercing the plane of the resultant air load vectors thereof below said airfoil.

5. An aircraft having a floating airfoil pivoted about an axis of pivotation so disposed relative to the plane of the resultant air load vectors of said airfoil as to cause said airfoil to float at a predetermined angle of attack.

6. An aircraft having floating airfoil means pivoted about a line of rotation piercing the stable air load distribution zone of said means and below said means extending within the zone of the vectors of the stable air load distribution.

7. An aircraft having stable airfoil means pivoted about a line of rotation piercing the plane of the resultant air load vectors externally of said means and in a stable region below the latter.

8. An aircraft having floating airfoil means pivoted about a line of rotation extending angularly relative to said means beyond that side thereof normally of positive pressure and through the stable air load distribution area of said airfoil.

9. An aircraft having airfoil means normally producing lift to the craft and movable above a line of rotation extending angularly relative to said means and piercing the zone of the resultant air load vectors in a stable region.

10. An aircraft having floating airfoil means pivoted about a line of rotation which lies in part within the stable air load distribution area of said means and pierces the plane of the resultant air load vectors in a stable region.

11. An aircraft having stable airfoil means pivoted about a line of rotation extending angularly downward relative to said means and piercing the zone of the resultant air load vectors thereof within the stable air load distribution area of said means.

12. An aircraft having floating airfoil means pivoted about a line of rotation extending angularly downward relative to said means and into the stable air load distribution area thereof.

13. An aircraft having floating airfoil means pivoted about a line of rotation extending angularly downward relative to said means and into the stable air load distribution area thereof and a cantilever connection connecting one end of said means to said craft.

14. An aircraft having floating airfoil means pivoted about a pivot disposed angularly relative to said means and having under normal flying conditions a floating position varying with the speed of flight.

15. An aircraft having floating airfoil means pivoted about a pivot disposed angularly relative to said means and floating under normal flying conditions at substantially a constant angle of attack.

16. An aircraft having pivoted airfoil means pivoted about a pivot disposed angularly relative to said means and automatically adjustable into floating positions varying with the speed of flight and having automatic torque creating means opposing the air load.

17. An aircraft having airfoil means pivoted about a line of rotation disposed angularly relative to said means and having torque creating means constantly opposing the air load.

18. An aircraft having airfoil means pivoted about a line of rotation lying substantially in the stable air load distribution zone of said means and piercing the plane of the resultant air load vectors of said means externally of the latter and torque creating means constantly opposing the air load.

19. An aircraft having airfoil means pivoted about a relatively angularly disposed line of rotation which lies substantially in the stable air load distribution area of said means and torque creating means constantly opposing the air load.

20. An aircraft having airfoil means and cooperating pivot and torque exerting means, the former angularly disposed relative to said airfoil means, for automatically maintaining said means floating stably at a given angle of attack depending upon the air speed.

21. An aircraft having floating airfoil means movable about an angularly disposed pivot line extending into the stable air load distribution area and that part of the same which contains the vectors of small lift coefficients.

22. An aircraft having airfoil means movable about an angularly disposed pivot line extending into the stable vector distribution area and that part of the same which contains the vectors of small lift coefficients and torque creating means constantly urging said means into higher angles of attack.

23. An aircraft having airfoil means floating about a downwardly and outwardly disposed pivot and having torque exerting means opposing the air load moments for any speed of flight.

24. An aircraft having floating airfoil means pivoted about a pivot disposed angularly relative to said means and piercing the plane of the resultant air load vectors in a stable region, and also having said means normally floating at substantially a constant angle of attack.

25. An aircraft having an angularly disposed axis of airfoil rotation piercing the plane of the resultant air load vectors of the airfoil in a stable region of appreciable thrust producing vectors, and airfoil means pivoted about said axis and tending to float stably at substantially a constant angle of attack.

26. An aircraft having airfoil means pivoted substantially on the air load vector of maximum L/D and floating at the angle of attack of maximum L/D irrespective of the angle of attack of the craft.

27. An aircraft having floating ailerons pivoted about lines of rotation lying substantially in the stable air load distribution areas of the same and piercing the planes of the resultant air load vectors externally of said ailerons.

28. An aircraft having ailerons pivoted about a line of rotation lying substantially in the stable air load distribution zone of the same and piercing the plane of the resultant air load vectors of said ailerons externally of the latter and cantilever connections between the inner ends of said ailerons and said craft.

29. An aircraft having differentially connected floating ailerons pivoted about lines of rotation extending angularly relative to said ailerons beyond the sides of the latter normally of positive pressure and through the stable air load distribution areas of said ailerons.

30. An aircraft having differentially connected ailerons each pivoted about a relatively angularly disposed line of rotation which lies substantially in the stable air load distribution area of the same and torque exerting means supplementary to said ailerons constantly urging the same into a higher angle of attack.

31. An aircraft having a control stick movable fore and aft to control the elevation thereof, differentially connected floating ailerons pivoted substantially in the stable air load distribution area of said ailerons, and means for adjusting the floating positions of said ailerons upon fore and aft movements of said stick.

32. An aircraft having ailerons each normally floating about an angularly disposed pivot line lying substantially in the stable air load distribution area thereof and means for adjusting during normal flight the angle of attack thereof.

33. An aircraft having ailerons each normally floating about an angularly disposed pivot line lying substantially in the stable air load distribution area thereof and means for adjusting both ailerons in the same direction during flight while maintaining the angle of attack and speed of the craft.

34. An aircraft having wings and ailerons and means including downwardly and outwardly inclined pivots for disposing said ailerons in folded position beneath the wings.

35. An aircraft having wings and floating ailerons forming lateral extensions at the opposite extremities thereof, and means for disposing said extensions in depending folded position beneath the wings.

36. An aircraft having wings and ailerons and means for disposing the latter in folded position beneath the wings automatically operable as the craft comes to rest.

37. An aircraft having airfoil means and means for automatically effecting disposal of the same in braking position as the craft comes to rest.

38. An aircraft having wings and forming lateral unitary extensions thereof, and means for effecting bodily disposal of said unitary extensions successively in braking and depending folded positions as the craft comes to rest.

39. An aircraft having wings and ailerons forming lateral extensions at the opposite extremities thereof, means for disposing the ailerons in depending folded position beneath the wings, and means operable from the cock pit of the craft for resetting said ailerons in flying position.

40. An aircraft having ailerons, means for automatically disposing the same in folded position as the craft comes to rest, and means operable from the cock pit of the craft for resetting said ailerons in flying position.

41. In an aircraft having wings, floating ailerons forming extensions thereof, and pivot means between said wings and ailerons angularly disposed relative to the latter having the axis of pivotation piercing the plane of the resultant air load vectors in a stable region.

42. In an aircraft having wings, ailerons forming extensions thereof, and angularly disposed cantilever pivot means between said wings and ailerons each comprising a pivot on the top of the wing inside the latter and another on the bottom of the wing inside the aileron.

43. An aircraft having wings and ailerons forming extensions thereof, said wings and ailerons having downwardly and inwardly disposed meeting faces therebetween and downwardly and outwardly disposed pivoting means providing supports on opposite sides of said meeting faces.

44. In an aircraft having wings and a control stick, floating ailerons forming extensions of said wings, downwardly and outwardly inclined pivot means between said wings and ailerons, connections between said ailerons controlled by said control stick for moving them differentially about said pivot means, and supplementary means for adjusting the floating position of said ailerons in either direction during flight to change the angle of attack.

45. An airfoil control mechanism for aircraft comprising pivoted floating airfoils, rotatable members each connectible to an airfoil and carrying a toothed member, a control stick, a co-operating toothed member movable therewith and reversely operating said first mentioned toothed members, a supplementary control member, and operative connections for adjusting said first mentioned members therewith independently of the control stick.

46. An airfoil control mechanism for aircraft comprising rotatable members each connectible to an airfoil and carrying a toothed member, a control stick, a co-operating toothed member movable therewith and reversely operating said first mentioned toothed members, and resilient means controlling the movement of said first mentioned members in fore and aft movements of the control stick.

47. In an airfoil controlling mechanism for aircraft, pivoted floating airfoils, members connected to different airfoils, means movable to reversely operate said members, and means movable about the axis of said members for moving said members together.

48. In an airfoil controlling mechanism for aircraft, members connectible to different airfoils, means movable to reversely operate said members, means movable about the axis of said members for moving said members together, and a control stick operatively connected to said first mentioned means and movable substantially about an axis intersecting the axes of said members.

49. In an airfoil controlling mechanism for aircraft, members connectible to different airfoils, means movable to reversely operate said members, means movable about the axis of said members for moving said members together, a control stick operatively connected to said first mentioned means, and a supplementary control member connectible at will to said last mentioned means.

50. An aircraft having operatively connected differentially operated floating ailerons each having a resilient connection, and means for independently adjusting said resilient connections to vary the automatic floating position of one aileron relative to the other to obtain lateral stability of the plane.

51. An aircraft having sustaining means movable about lateral pivotation means disposed forward of the resultant thrust vectors and piercing the plane of the resultant air load vectors in a determinate position relative to the stable air load vectors of said sustaining means and biasing means for said sustaining means.

52. In an aircraft, a body, an airfoil sustaining means movable about lateral pivotation means on said body forward of the resultant thrust of said sustaining means and piercing the zone of the resultant air load vectors thereof in a stable area, and resilient means against which the thrust of said sustaining means is biased.

53. An aircraft having a body and sustaining means therefor, and means for providing a shock reducing means between said body and sustaining means comprising lateral pivotation means for said sustaining means disposed forward of the resultant thrust vectors in the stable air load distribution area of said sustaining means and resilient means against which said sustaining means are biased.

54. An aircraft having a body, sustaining means acting at the top thereof and movable about lateral pivotation means disposed below said sustaining means and forward of the resultant thrust thereof and piercing the plane of the resultant air load vectors in a determinate position relative to the stable air load vectors of said sustaining means, resilient means against which said sustaining means are biased, and means operable from said body for adjusting said sustaining means about said pivotation means.

55. An aircraft having wings movable about a downwardly inclined pivot and torque exerting means constantly tending to move said wings into a higher angle of attack.

56. An aircraft having floating wings movable about a downwardly inclined pivot and torque exerting means constantly tending to move said wings into a higher angle of attack.

57. An aircraft having wings movable about a downwardly inclined pivot and torque exerting means constantly tending to move said wings into a higher angle of attack and operatively connected to said wings in rear of said pivot.

58. An aircraft having wings movable about a downwardly inclined pivot and torque exerting means constantly tending to move said wings into a higher angle of attack and operatively connected to said wings in rear of said pivot, and supplementary means for moving said wings about said pivot operable from the cock pit of the craft.

59. An aircraft having wings movable about a downwardly inclined pivot and torque exerting means constantly tending to move said wings into a higher angle of attack and operatively connected to said wings in rear of said pivot, and supplementary means for moving said wings about said pivot operable from the cock pit of the craft and controlled by the control stick thereof.

60. An aircraft having floating air foil means pivoted about a line of pivotation piercing the plane of the resultant air load vectors of said air foil means in or substantially in the stable air load distribution area of the latter.

61. In an aircraft, floating air foil means pivoted about a line of pivotation piercing the plane of the resultant air load vectors of said air foil means in or substantially in the stable air load distribution area of the latter, and means for biasing said air foil means about said pivot against the air loads.

62. An aircraft having floating air foil means pivoted about a line of pivotation piercing the plane of the stable resultant air load vectors of said air foil means on the vector which represents the angle of attack at which said air foil means is to tend to float stably.

63. In an aircraft, floating air foil means pivoted about a line of pivotation piercing the plane of the resultant air load vectors of said air foil means forward of a given vector, and torque creating means equivalent to the moment of said given vector about the pivot for biasing said air foil means about said pivot against the air loads.

64. An aircraft having air foil means pivoted about a line of rotation lying substantially in the stable air load distribution zone for said air foil means when stable and in a neutral zone for said air foil means when unstable and piercing the plane of the resultant air load vectors of the air foil means externally of the latter.

65. An aircraft having an air foil pivoted about an axis of pivotation extended into the stable air load distribution area thereof when said air foil is stable and into a neutral zone when said air foil is unstable and piercing the plane of the resultant air load vectors below said air foil adjacent the convergence point of lines of neutral stability.

66. An aircraft having air foil means movable about an axis of pivotation extending transversely of the craft and piercing the plane of the resultant air load vectors of said air foil means in the neutral zone below said means when the latter is unstable, and means for adjusting the angle of attack of said air foil means about said axis.

67. An aircraft having air foil means movable about an axis of pivotation extending transversely of the craft and substantially spaced below the chord line of said air foil means and piercing the plane of the resultant air load vectors thereof in the neutral zone of the air foil when the latter is unstable, and means for adjusting the angle of attack of said air foil means about said axis of pivotation to increase the lift and brake the craft.

68. An aircraft having air foil means pivoted about a line of rotation lying in the neutral zone adjacent the stable air load distribution zone of said means when the latter is unstable and piercing in said zone the plane of the resultant air load vectors of said means externally of and below the latter, and means for adjusting the angle of attack of said air foil means about said line of rotation to increase the lift.

69. An aircraft having air foil means pivoted about an axis of pivotation extending into the neutral zone adjacent the top of the stable air load distribution area of said means when the latter is unstable and piercing in said zone the plane of the resultant air load vectors thereof below said air foil, and means for adjusting the angle of attack of said air foil means about said axis of pivotation to increase the lift and brake the craft.

70. An aircraft having wings and a plurality of air foil means in balanced relation thereon and movable about axes of pivotation piercing the plane of the resultant air load vectors of said air foil means adjacent the convergence point of vectors of neutral stability below said means when the latter are unstable and extending transversely of said wings, and means for adjusting said air foil means about said transversely extending axes to increase the lift.

71. An aircraft having wings and a plurality of air foil means in balanced relation thereon and movable about axes of pivotation spaced substantially below the chord line of said air foil means and piercing the plane of the resultant air load vectors thereof in a neutral zone adjacent the convergence point of vectors of neutral stability when said means are unstable and extending transversely of said wings, and means for simultaneously adjusting the angle of attack of said air foil means on different wings about said transversely extending axes into braking position.

RICHARD H. PREWITT.

CERTIFICATE OF CORRECTION.

Patent No. 1,989,291. January 29, 1935.

RICHARD H. PREWITT.

It is hereby certified that error appears in the printed specification of the above numbered patent requiring correction as follows: Page 7, second column, line 14, claim 2, strike out the word "stable"; and line 16, of said claim, after "means" insert the words and stabilizing the latter; and that the said Letters Patent should be read with these corrections therein that the same may conform to the record of the case in the Patent Office.

Signed and sealed this 12th day of March, A. D. 1935.

Leslie Frazer (Seal) Acting Commissioner of Patents.